United States Patent [19]
Stoll et al.

[11] Patent Number: 5,697,726
[45] Date of Patent: Dec. 16, 1997

[54] COUPLING DEVICE FOR LINEAR DRIVES

[75] Inventors: Kurt Stoll, Esslingen; Johannes Volzer, Heroldstatt, both of Germany

[73] Assignee: Festo KG, Esslingen, Germany

[21] Appl. No.: 646,112

[22] Filed: May 7, 1996

[30] Foreign Application Priority Data

May 24, 1995 [DE] Germany ............ 295 08 663 U

[51] Int. Cl.$^6$ .................. F15B 15/14; F01B 29/00
[52] U.S. Cl. ................. 403/291; 403/220; 92/88
[58] Field of Search ................. 92/88; 403/291, 403/220

[56] References Cited

U.S. PATENT DOCUMENTS

| | | | |
|---|---|---|---|
| 1,660,029 | 2/1928 | Bell | 403/220 X |
| 3,212,046 | 10/1965 | Abel et al. | 403/291 X |
| 5,158,388 | 10/1992 | Ruf | 403/220 X |
| 5,275,088 | 1/1994 | Takada et al. | 92/88 |
| 5,469,940 | 11/1995 | Yamamoto et al. | 92/88 X |

FOREIGN PATENT DOCUMENTS

| | | |
|---|---|---|
| 0 582 782 | 2/1994 | European Pat. Off. . |
| 40 24 717 | 2/1992 | Germany . |
| 42 25 563 | 2/1994 | Germany . |

OTHER PUBLICATIONS

Krause, et al., *Konstruktionselemente der Feinmechanik*, VEB Verlag Technik, Berlin, 1989, pp. 392–394.

*Primary Examiner*—Anthony Knight
*Attorney, Agent, or Firm*—Hoffmann & Baron, LLP

[57] ABSTRACT

A coupling device for linear drives for linking a drive part performing a linear movement in an axial direction with a guide part guided for longitudinal movement on a longitudinal guide parallel to the direction of movement. A force input part connected with the drive part and a force output part connected with the guide part are provided, the force input part and the force output part being coupled together kinetically by means of an intermediately placed link member. As a link member and a elongated or longitudinal spring member is provided which is able to be bent in at least one transverse direction in a resiliently elastic manner and is non-yielding in its longitudinal direction, said spring member being aligned at least substantially in the axial direction. It is secured at a first connection point to the force input part and at a second connection point spaced from the first connection is connected with the force output part, in each case non-movably in the axial direction.

21 Claims, 3 Drawing Sheets

COUPLING DEVICE FOR LINEAR DRIVES

BACKGROUND OF THE INVENTION

The invention relates to a coupling device for linear drives for linking a drive part, performing a linear movement in one axial direction, of the linear drive with a guide part guided for movement on a longitudinal guide parallel to the direction of movement of the drive part, comprising a force input part connected with the drive part or constituted by same, and a force output part connected with the guide part or constituted by same, the force input part and the force output part being linked together by means of a link member, placed between them, such linking being with respect to movement in the axial direction.

THE PRIOR ART

Machines or other equipment frequently possess guide parts running on longitudinal guides and on which components are secured which are to be moved for certain purposes. For instance it may be a question of conveying slides or carriages adapted to be fitted with workpieces to be positioned. The movement of the guide part is ensured by linear drives, which for example are operated electrically or pneumatically. Examples for such linear drives include fluid power cylinders, which are frequently also designed without a piston rod as for example disclosed in the German patent publication 4,137,789 C2.

In order to produce the drive connection the guide part running along outside the linear drive, and which is to be moved, is linked with the drive part of the linear drive, same performing an axially directed linear movement when operating. For this purpose it is necessary to install the linear drive to be exactly parallel to the longitudinal guide in order to minimize wear which might otherwise be caused by errors in alignment. Owing to inaccuracies in manufacture and in assembly an accurately aligned arrangement is however extremely difficult to ensure. Therefore suggestions have already been made to place a coupling between the guide part and the drive part, which automatically performs compensation of errors in alignment. Such a coupling possesses a force input part connected with the drive part and on which a force input part is mounted using a transverse bolt as a linking member, it being possible to secure the input force input part to the guided guide part. If the link member with is fitted with play the force output part is able to perform relative movements athwart the force input part, which compensate for the errors in alignment. It is however disadvantageous here that the connection is also subject to play in the axial direction, that is to say in the direction of the linear motion, this rendering exact positioning of the guide part impossible. More particularly in the case of servo-pneumatic systems an axial play of as little as a few tenths of a millimeter will lead to extremely adverse effects on the quality of regulation with instability in the control loop. Although expensive spherical or universal joints might be provide a contribution toward avoiding axial play, same are relatively bulky and expensive.

SHORT SUMMARY OF THE INVENTION

One object of the invention is to consequently provide a coupling device of the type initially mentioned, which while having a low-price structure renders possible compensation of alignment errors and also practically complete freedom from play in the axial direction.

In order to achieve these and/or other objects appearing from the present specification, claims and drawings, in the present invention the link member is provided in the form of an elongated spring member which is resiliently and elastically flexible at least in one transverse direction and is non-yielding with respect to a load in its longitudinal direction, said spring member being at least substantially aligned in the axial direction and being secured, in each case in an axially immobile manner, at a first connection point to the force input part and at a second connection point axially spaced from the first connection point to the force output part.

Accordingly due to the transverse flexibility of the link member relative movement is permitted to compensate for any alignment error present between the force input part and the force output part, which does not cause any axial play. The desired degrees of freedom from flexure may consequently be affected and pre-set by a corresponding design of the spring member. As a rule a spring member will be provided, which is flexible at least in the direction which is radial in relation to the axial direction of the linear movement and accordingly will compensate for any departures in the radial distance apart. The axially unyielding design of the spring member ensures a direct and un-falsified transmission both of tensile forces and also of compression or thrust forces between the force input part and the force output part so that axially directed relative motion is without effect. Using such a coupling device an exact positioning of the linked guide part becomes possible, there then being an extremely high quality of regulation.

Further advantageous developments of the invention are defined in the claims.

In accordance with a preferred embodiment the spring member comprises a tabular or plate-like arrangement exclusively able to be bent athwart the plate plane, the spring member being preferably so aligned that the possible direction of bend extends radially. In this case radial alignment errors may be readily compensated for by the flexibility of the spring member without any play.

In order to render possible compensatory motion in other transverse directions a convenient development of the invention provides a feature such that at the two connection points the spring member is respectively articulatingly connected with the associated part, that is to say with the force output part or with the force input part. The pivot axes will conveniently extend in parallelism to the plane of possible transverse motion of the spring member. The pivotal bearing may be made practically free of play, for example by using bolt joints which are fitted free of play. By providing such a joint connection at both connection points it is possible for the force input part and the force output part to be shifted athwart the plane of flexure independently from one another as may be necessary in order to allow for any errors in alignment.

In order to obtain both the desired flexibility in the transverse direction and also in the required stiffness in the longitudinal direction, as the spring member an arrangement is preferably provided which comprises a tabular spring band, which inherently possesses the necessary elastic transverse flexibility, and which due to its being provided with bracing plates is endowed with the necessary tensile and compressive stiffness. Local intermediate spaces between adjacent bracing plates set regions, in which the spring member is still flexible, but whose width as measured in the longitudinal direction is limited to a degree, such that under a compressive load compression of the spring band material is prevented. Accordingly integrated solid joints are in effect present, which do not impair the axial tensile and compressive strength of the spring member.

Since the force input part and the force output part are respectively only connected with the spring member at the said connection point, it has turned out to be beneficial if the three components are additionally connected with one another by a stabilizing mass of rubber-elastic, yielding material in order to endow the interlocked structure with sufficient strength as a whole. The stabilizing mass may also ensure a perfectly regular basic setting between of the individual components in relation to each other and facilitate assembly. Furthermore, it may serve for sealing off any joint regions present at the connection points.

In what follows the invention will be described with reference to the accompanying drawings.

LIST OF THE SEVERAL VIEWS OF THE FIGURES

DETAILED ACCOUNT OF WORKING EMBODIMENTS OF THE INVENTION

Figure 1:
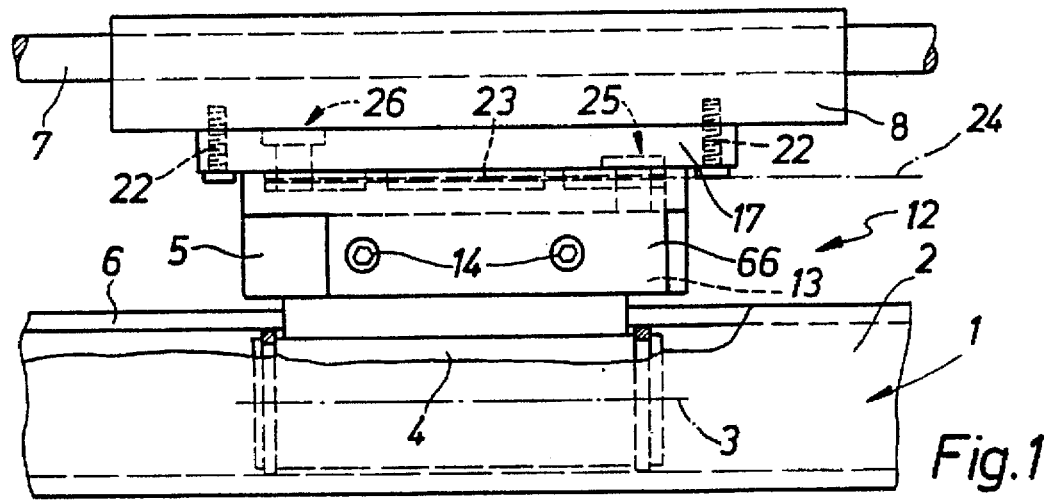
FIG. 1 shows a first embodiment of the coupling device of the invention in operation, a linear drive and an external longitudinal guide being illustrated in part.

FIG. 1 illustrates a portion of the length of a known linear drive 1, whose design may for example be in accord with the said German patent publication 4,137,789 C2. In this case it is a question of a pistonrod-less pneumatically operated linear drive 1 having a housing 2 provided with a sealed longitudinal slot 6. In the housing 2 a drive part 4, in the present case a piston, is arranged which is able to be operated to perform a linear movement in an axial direction 3 when acted upon by pressure. It could however also be a question of an electric motor operated linear drive, in which case the drive part 4 would for example be moved by a toothed belt.

The section of the drive part 4 arranged in the housing 2 is fixedly connected with a dog part 5, arranged outside the housing 2, by means of a web part extending through the longitudinal slot 6. It is entrained in step on linear motion of the drive part 4.

The linear drive 1 is installed in a machine in a manner not illustrated in detail, such machine possessing, as shown in FIG. 1, a longitudinal guide 7 which is for instance constituted by a rod guide. This guide 7 extends in parallelism to the longitudinal axis or, respectively, axial direction 3 of the linear drive 1. On it a guide part 8, for example in the form of a slide or carriage, is mounted for longitudinal running movement. The guide part 8 is a component of a guide carriage, not illustrated in detail, which in the course of operation of the machine, not illustrated in detail, is to perform a linear movement along the longitudinal guide 7.

The linear movement of the guide part 8 is produced by the linear drive 1. For this purpose the drive part 4 is permanently linked with the guide part 8. For such linking the coupling device 12 of the invention is employed which is illustrated here in a preferred design thereof.

The coupling device 12, illustrated by way of example, possesses a force input part 13, which in the present case is attached by means of a screw connection 14 in a detachable but firm fashion on the dog or entraining part 5 of the drive part 4. As seen in plan the force input part 13 possesses a U-like configuration with two mutually parallel bearing limbs 15 straddling the rail-like dog part 5. On their back side the two bearing limbs are rigidly connected together by means of a transverse web 16, which, with the coupling device 12 in the fitted position, bears on the top side, facing away from the housing 2, of the dog part 5. The screw connection 14 possesses clamping screws extending through the dog part 5 and which are at least partly able to thrust the bearing limbs 15 against side surfaces of the dog part 5 and accordingly to ensure an interlocking and force fitted, play-free connection.

On side of the force input part 13 opposite to the dog part 5, a force output part 17 of the coupling device 12 is arranged. It is joined in a detachable, play-free and firm manner with the guide part 8. In the present example it is constituted by a plate, which possesses a plurality of apertures 18 rendering possible attachment to the guide part 8 with the aid of a screw connection 22.

Between the force input part 13 and the force output part 17 and radially with respect to the longitudinal axis or, respectively, axial direction 3, a link member 23 is placed, via which the two parts are kinetically linked in the axial direction. The link member 23 is a part with a longitudinal extent which is aligned in the axial direction 3 so that in the starting position appearing from FIGS. 1 through 6 its longitudinal axis 24 extends in parallelism to the axial direction 3.

At a first connection point 25 associated with the rear region of the coupling device 12, the link member 23 is fixed to the force input part 13 in an axially immovable manner. At an axially measured distance from this, at a second connection point 26, the link member 23 is furthermore secured on the force output part 17, also in an axially immovable fashion. No further connection points serving for the transmission of forces are provided.

The link member 23 is so designed and arranged that it is in a position of transmitting tensile and thrust forces introduced at the connection points 25 and 26 in the axial direction, without any loss and directly between the two parts 13 and 17. Accordingly it is possible to ensure that the movement of the drive part 4 is transmitted to the guide part 8 practically without any departure in the axial direction. Furthermore it is possible for the link member 23 to compensate for alignment errors between the linear drive 1 and the longitudinal guide 7 and arising owing to the fact that it is impossible, with a reasonable amount of effort, to attain a perfectly parallel positioning in the course of manufacture and/or assembly of such equipment. In fact therefore the drive part 4 and the guide part 8 do not run in complete parallelism to each other during operation and their positions as assumed in the transverse direction in relation to each other are continuously subject to change. Owing to the coupling device 12 it is just in such transverse direction that a certain de-coupling effect is obtained rendering possible relative motion between the devices in the transverse direction so that strains conducive of wear do not occur.

In order to obtain the desired properties the link member 23 is in the form of an elongated spring member 28 which is resiliently and elastically flexible in at least one transverse direction 27 and is unyielding in its longitudinal direction 24. The axial tensile and compressive rigidity ensure force transmission without irregular transverse deformation, while simultaneously the transverse elasticity renders possible a change in the relative position between the force input part 13 and the force output part 17.

In the illustrated working embodiment the spring member 28 is so designed that it is only in the case of loads occurring in a certain transverse direction 27 that there is flexibility. This possible flexure movement 27 is directed radially with respect to the longitudinal axis or, respectively, axial direction 3. In other words, the spring member 28 is in a position to bend resiliently and elastically toward the guide part 8 and the drive part 4. This means that there is a first degree of freedom for the alignment error compensating movement.

It would be possible for example to employ a torsion rod spring or the like as the spring member 28, which is flexurally elastic in all transverse directions. It could be rigidly fixed at the connection points 25 and 26 and would, with the exception of an axial relative movement, permit all other necessary forms of relative movement between the two parts 13 and 17. It is however preferred to provide the configuration illustrated in the drawing, in the case of which only the above mentioned degree 27 of freedom is permitted by the flexibility of the material. Two further degrees 32 and 33 of freedom, in the case of which it is a question of rotational degrees of freedom, are defined in accordance with the type of connection between the spring member 28 and the force input part 13 and, respectively, the force output part 17. The system of the present example does not possess any other degrees of freedom.

In order to ensure the above mentioned degrees 27, 32 and 33 of freedom the spring member 28 is designed in the form of an elongated tabular or plate-like arrangement, which could also be termed a rail-like arrangement. In the starting position the spring member 28 extends in a plane running parallel to the axial direction 3. The spring member 28 is so arranged between the force input part 13 and the force output part 17 that the one top plate surface 34 faces the force output part 17 and the opposite bottom plate surface 35 faces the force input part 13. An imaginary plane extending through the longitudinal axis 24 and aligned to be at a right angle to the plate plane 36 of the spring member 28 runs, in the present case, through the longitudinal axis or, respectively, axial direction 3 of the housing 2, with respect to which it extends in parallelism.

The two connection points 25 and 26 are associated with the axial end parts of the spring member 28. Here the spring member 28 is in each case borne pivotally but however in a practically play-free fashion on the respectively associated part 13 and 17 in order to ensure the two degrees 32 and 33 of freedom. The bearing means is such that respectively one rotary or, respectively, one pivot axis is defined, which axes extend parallel both with respect to each other and also with respect to the plane of possible transverse motion 27 of the spring member 28. In the example they are at a right angle to the plate plane 36.

In order to produce a play-free articulated connection the joint bearings are designed in the form of play-free bolt or lynch pin joints. The spring member 28 is connected with both parts 13 and 17 by means of its pivot bolt 42, whose longitudinal axis sets the join axes 37 and 38. At the two connection points 25 and 26 the spring member 28 possesses a through hole 43 extending athwart the plate plane 36, there being an aligned hole 44 in the respectively associated part 13 and 17. A joint bolt 42 or pin extends at least partially through each pair of holes 43 and 44. The connection between the joint bolts 42 and respectively one hole of the two associated holes 43 and 44 is made with a transition fit whereas the connection is made with a press fit.

At the first connection point 25 the joint bolt 42, having a head 45, is inserted from above through the hole 43 in the spring member 28 with a transition fit and has its free end set in the hole 44, formed in the transverse web 16, in the force input part 13. The end region of the spring member 28 is held between the head 45 and the transverse web 16 in the direction of the associated joint axis 38 free of play. As a consequence of the transition fit the spring member 28 does however have the possibility of turning in relation to the force input part 13 at least to a limited extent or to a slight degree, in accordance with the degree of pivotal freedom.

At the second connection point 26 the joint bolt 42 is firstly extended from the outside through the hole 44 in the front end part of the tabular force output part 17, this being with a transition fit. The end part, projecting past in a downward direction toward the force input part 13, of the joint bolt 42 is inserted in the associated hole 43 in the spring member 28 with a press fit. The spring member 28 has its top plate surface 34 in engagement with the bottom side of the force output part 17 free of play. In this respect the spring member 28 can be at least partly received in a downwardly open recess 46 in the force output part 17, there being however a surrounding gap 47 at the margin between the spring member 28 and the lateral limiting surfaces of the recess 46. Accordingly between the force output part 17 and the spring member 28 limited rotary movements are possible around the associated joint axis 37, which define the second degree 33 of pivotal freedom.

In order to ensure mobility of the spring member 28 in relation to the force output part 17, the spring member can be rounded off at the corners thereof, the gap 47 being designed with ample dimensions.

Figure 7:
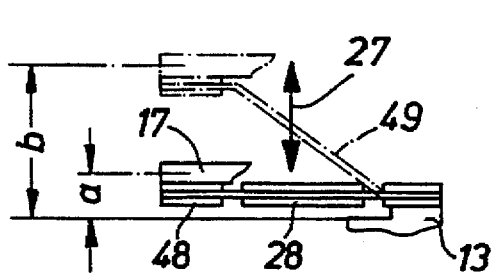
FIG. 7 shows the link member employed in the embodiment in the starting position thereof and in a deflected position illustrated in an exaggerated manner in chained lines.

Accordingly owing to the flexural elastically of the spring member 28 relative transverse movement between the force output part 17 and the force input part 13 is possible in the course of which movements the two parts may vary in their distances apart as measured in a direction perpendicular to the plane 36 of the plate. Furthermore it would be feasible to provide for parallel displacements and forms of shifting, in the case of which the two parts leave their relative parallel position and assume any desired angular setting in relation to one another. As an example thereof attention is called to FIG. 7, which on the one hand shows the initial position 48 and on the other hand shows a deflected position 49 in chained lines of the spring member 28, in which there are different distances apart a and b between the two parts 13 and 17. In this case it is a question of an exaggerated representation and actually it is a matter of movement in a tenths of a millimeter range.

Figure 8:
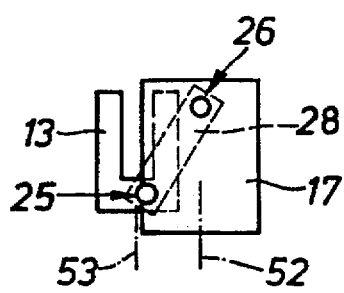
FIG. 8 shows the coupling device in a plan view and in an exaggerated manner similar to FIG. 5 in a relative pivoted position, as caused by errors in alignment, between the individual components.

Owing to the degrees 32 and 33 of freedom for pivoting relative rotary movement between the force output part 17 and the spring member 23 on the one hand and between the spring member 28 and the force input part 13 may take place. This allows for an error in alignment in the plane of the spring member 28, that is to say at a right angle to the plane of the transverse movement the spring member 28. The degrees 32 and 33 of freedom of the pivotal movement are entirely independent of one another. For instance, lateral parallel displacement of the two parts 13 and 17 is rendered possible, in the course of which a lateral parallel offsetting movement occurs, as shown in FIG. 8. The showing is here as well greatly exaggerated in order to render the principle of operation clear. However also pivotal movements around the axes 37 and 38 are possible, the effect of which is that the longitudinal axes 52 and 53 of the two parts 13 and 17 are no longer parallel to each other as shown in FIG. 8 but are set at a small acute angle to one another.

Since the degrees of freedom are independent of the instantaneous flexural displacement of the spring member 28, it is possible for all degrees of freedom to be employed simultaneously as may be required. This renders possible an automatic compensation of any errors in alignment and the coupling device 12 is in a position to allow for any transverse departures in parallelism between the guide part 8 and the drive part 4 without amy problems.

The significant advantage of this arrangement is that the compensation of alignment errors is practically without effect on the relative axial position between the guide part 8 and the drive part 4. In every operational setting the coupling device 12 ensures an axially play-free connection between the mounted parts.

In order to ensure the desired stiffness in the longitudinal direction 24 and simultaneously the desired flexibility for bending in the transverse direction 27 the spring member 28 in the embodiment possesses a tape-like, thin spring plate 54 more especially manufactured of spring steel, which extends axially from end to end. This spring plate 54 has the desired flexural elastically and may take up extremely high forces in the tensile direction. In the compression direction as well there is, from the thrust strain aspect, a large safety margin, although however due to the unfavorable degree of slenderness (Euler) there would be the danger of buckling in the transverse in the case of thrust loads, something which inter alia might lead to relative axial movements between the force input part 13 and the force output part 17. In order to prevent this the spring plate 54 is armored on either side over a large area with several bracing plates 55 and 55', same being secured for instance by rivet joints, spot welds or adhesive bonds. The bracing plates 55 and 55' on the two sides are associated with one another in pairs. In the present case three bracing plates 55 and 55' are provided, one of such plates being in the middle and two being at the ends. The bracing plates 55 and 55' cover practically the entire surface of the spring plate 54. Bracing plates 55 immediately following each other axially are however arranged with a distance between them so that there are uncovered and non-reinforced plate regions 56, there being in the present case two such uncovered spring plate regions 56 on each side of the spring plate with an axial distance apart. Opposite each uncovered spring plate region 56 on the one plate side there is a corresponding uncovered spring plate region 56 of the other spring plate side.

Accordingly adjacent to the pairs of uncovered spring plate regions 56 the spring member 28 possesses regions with a reduced thickness of the spring member as compared with the axially adjoining spring member regions. While the spring plate 54 is reinforced in the covered regions and accordingly is stiffened, in the uncovered spring plate regions 56 transverse flexibility is fully maintained. The uncovered spring plate regions 56 consequently each constitute a sort of solid joint 67, whose pivot axes 58 are aligned perpendicularly to the longitudinal axis 24 of the spring member 28 in the plate plane 36. They furthermore ensure the necessary transverse flexibility.

The axially measured width c of the uncovered spring plate regions 56 is selected to be so small that the tension and thrust forces occurring during normal operation are unable to cause any displacement affecting the axial dimensions. The coupling device 12 accordingly possesses an axially stiff spring member 28 which is however flexible in the transverse direction adjacent to the solid joints 57.

It is preferred for the solid joint 57 to be arranged adjacent to the first connection point 25 and for the other solid joint 57 to be arranged adjacent to the second connection point 26. Since two spaced apart solid joints 57 are present, parallel displacements of the two parts 13 and 17 in the transverse direction 27, that is to say in the longitudinal direction of the pivot axes 37 and 38 are possible without excessive strains occurring.

Figure 3:
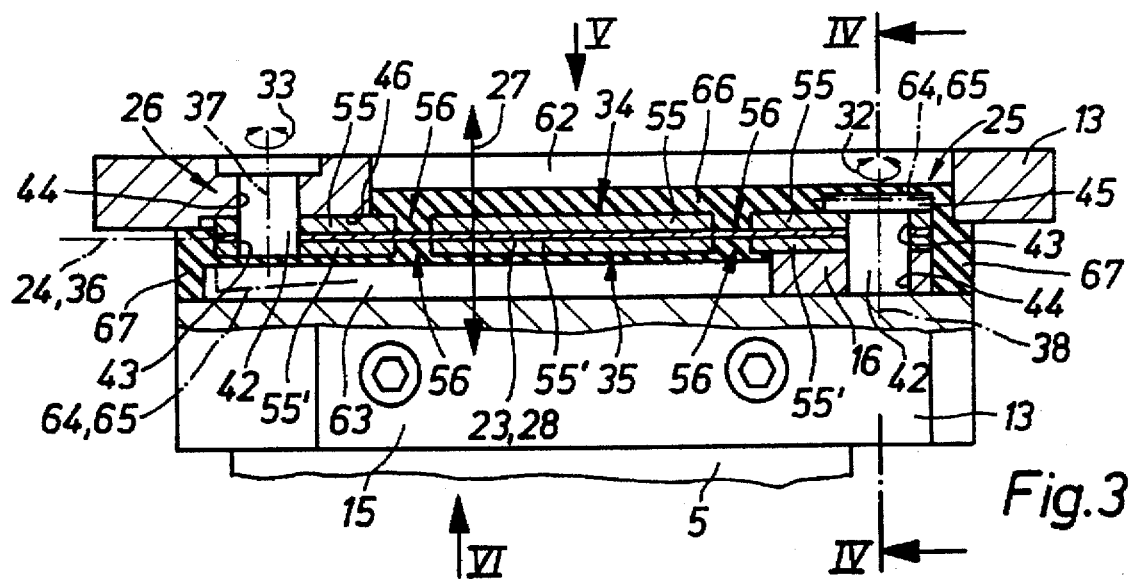
FIG. 3 shows the coupling device of FIG. 2 in a longitudinal section taken on the line III—III of FIG. 4.
Figure 4:
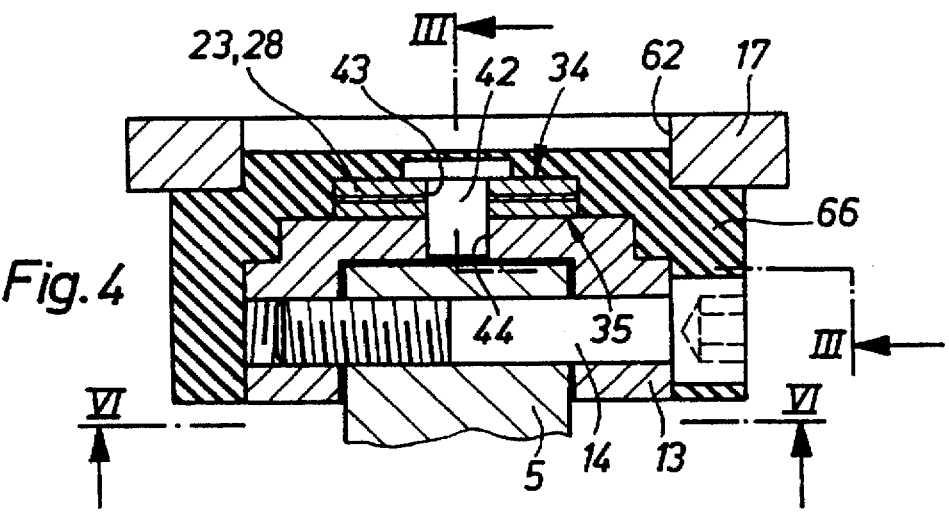
FIG. 4 shows the coupling device of FIG. 2 in a cross section taken on the line IV—IV of FIG. 3.
Figure 2:
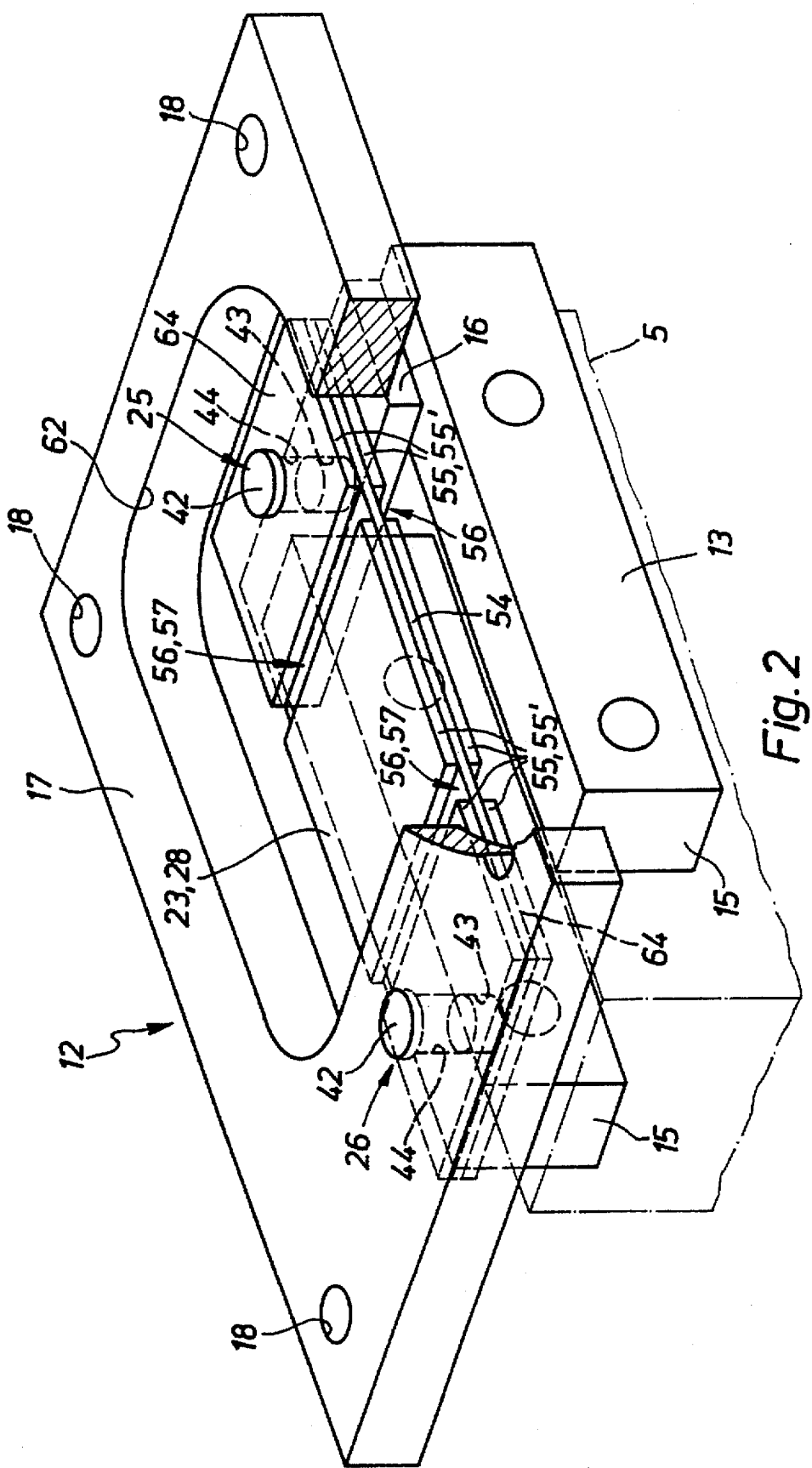
FIG. 2 shows the coupling device of FIG. 1 in a perspective and partially broken away separate view, the stabilizing mass not being shown in order to render the showing more straightforward.
Figure 5:
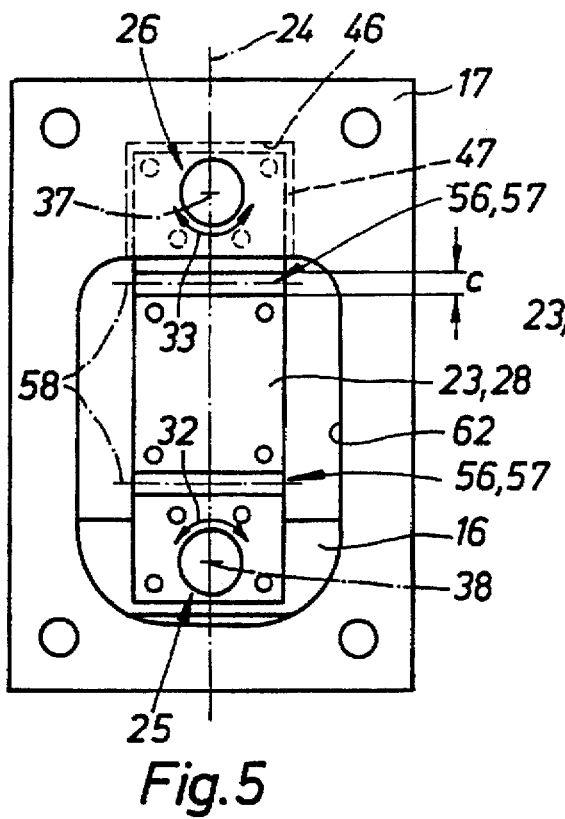
FIG. 5 is a plan view of the coupling device looking in the direction of the arrow V of FIG. 3.
Figure 6:
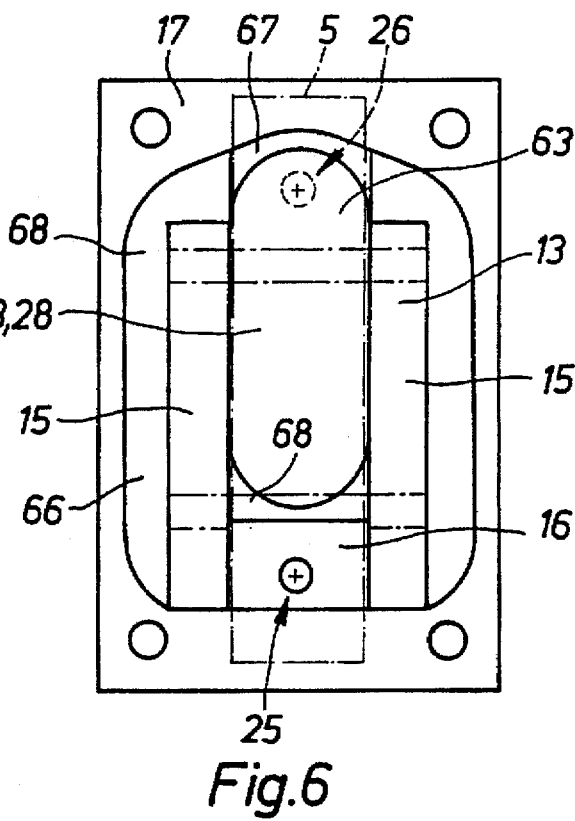
FIG. 6 shows a view from below of the coupling device looking in the direction of arrow VI of FIG. 3.

In order, starting from the basic position of the coupling in which the spring member 28 assumes its initial position, not only to render possible relative movement in the sense of a radial movement apart of the two parts 13 and 17, but also to allow for radial movement toward one another, suitable free spaces are provided so that the respective movement together is not hindered. Thus the force output part 17, unlike the spring member 28, possesses a recess 62, more particularly a through recess, which is radial in relation to the axial direction 3, and with the exception of the second connection point 26 extends along the entire spring member 28. The corresponding recess 63 is located between the spring member 28 and the force input part 13, which here apart from the region with the first connection point 25, extends for the entire spring member 28. At least the region of the spring member 28 opposite to the one respective connection point 25 and 26 is accordingly freely exposed. If now there is any type of radial movement together of the force input part 13 and the force output part 17, the end parts 64 associated with the connection points 25 and 26 may plunge without obstruction into the associated recess 62 and 63 in order to render possible the desired transverse motion. This is indicated in FIG. 3 at 65. The recess 63 in the force input part 13 is in the example formed by the region adjoining the front side at the transverse rib 16, which region is placed between the top side of the dog part of the bottom side of the spring member 28.

In order to provide the coupling device 12 with a certain degree of strength and in order to ensure an entirely regular basic or starting position, the force input part 13, the spring member 28 and the force output part 17 are connected together by a stabilizing mass 66 consisting of a material with rubber-elastic properties. The spring member 28 is preferably entire embedded in this stabilizing mass 66. The stabilizing mass 66 secures the individual parts 13, 17 and 28 in the basic position without however reducing the required mobility in operation. Sufficient flexibility for the operational properties required between the individual parts 13, 17 and 28 is maintained.

Portions of the stabilizing mass 66 are located more especially on the two end parts of the coupling device 12, where a rubber-elastic support and bearing locating action is ensured between the force input part 13 and the force output part 17. The corresponding parts of the stabilizing mass 66 are indicated at 67.

The stabilizing mass 66 furthermore fits as well into the intermediate spaces between the bracing plates 55 and 55'

Furthermore it extends at least partly into the recess 62. The recess 63 is only delimited at the outside (at 68) so that free space still remains for the pivot movement of the spring member 28 and free space is created for the material, which is deformed during transverse motion, of the non-compressible stabilizing mass 66. Owing to the recesses 62 and 63 available in the radial direction strains due to the non-compressible material behavior of the stabilizing mass are reduced in the case of radial displacements due to alignment errors. For this reason the recess 62 as well is not filled for its full height with the stabilizing mass 66.

For the stabilizing mass 66 it is possible for example to employ rubber or so-called NBR material. A further possible material would be foam materials with different fillers.

The coupling device 12 of the example is an additional component, which as required may be installed on the linear drive 1 and the guide part 8. As connection members use is made of the force input part 13 and the force output part 17. However it would be feasible to use the drive directly as the force input part 13 and the guide part 8 directly as the force output part. In this case the link member 23 would be fixed directly on the one hand on the drive part 4 and on the other hand on the guide part 8.

The coupling device 12 is also able to be employed when the drive part 4 is a piston rod or is some other driven part.

The longitudinal guide 7 is preferably an external guide not belonging to the linear drive 1. It could however be a direct component of the linear drive 1 and for example be arranged on the housing 2 of the linear drive 1.

We claim:

1. An assembly for coupling a linear drive to a linear guide comprising:
    a linearly traversable drive having a drive part for movement in an axial direction; a linearly traversable guide positioned substantially parallel to the linearly traversable drive for guiding the linearly traversable drive as the linearly traversable drive moves in the axial direction; and a coupling device including
    a force input part connected with the drive part;
    a force output part connected with the linearly traversable guide, the force input part and the force output part being coupled by a link member placed between them to restrict movement of the force input part and the force output part relative to each other in the axial direction;
    the link member including an elongated spring member which is resiliently and elastically flexible at least in one transverse direction and is non-yielding with respect to a load in its longitudinal direction, said spring member being at least substantially aligned in the axial direction and being secured in an axially immobile manner at a first connection point to the force input part and at a second connection point to the force output part, the second connection point being axially spaced from the first connection point.

2. The coupling device as set forth in claim 1, wherein the spring member comprises a tabular arrangement exclusively able to be bent athwart the plate plane.

3. The coupling device as set forth in claim 2, wherein the spring member has a first and second opposed surfaces and the spring member is so arranged between the force input part and the force output part that the first surface faces the force output part and the second surface faces the force input part.

4. The coupling device as set forth in claim 1, wherein the spring member is so designed and arranged that the possible movement in relation to the axial direction is essentially radial.

5. The coupling device as set forth in claim 1, wherein the spring member is pivotally joined at the two connection points in a rotary or pivotal manner with one degree of pivotal freedom at the associated force input part or, respectively, force output part.

6. The coupling device as set forth in claim 5, wherein the respective pivot axis of a respective connection point runs in parallelism to the plane of the possible transverse movement of the spring member.

7. The coupling device as set forth in claim 5, wherein the spring member is secured to the associated part via a joint bolt fitted in a play-free manner for a pivotal or rotary bearing arrangement.

8. The coupling device as set forth in claim 1, wherein the possible transverse movement of the spring member is ensured by two axially spaced local solid joints, which are set by regions with a reduced thickness of the spring member.

9. The coupling device as set forth in claim 8, wherein one respective solid joint is arranged adjacent to the connection points.

10. The coupling device as set forth in claim 8, wherein the spring member possesses a thin tape-like spring plate having the desired transverse flexibility and preferably manufactured of spring steel, which at least on one side and preferably on both sides is provided with bracing plates which are so arranged that uncovered spring plate regions remain, which define the solid joints.

11. The coupling device as set forth in claim 10, wherein the bracing plates are riveted, welded or bonded to the spring plate.

12. The coupling device as set forth in claim 1, wherein the linear drive is a piston rod less linear drive.

13. The coupling device as set forth in claim 12, characterized in that the force input part is provided on a dog part, provided on the drive part, same extending through a longitudinal slot from the housing of the linear drive.

14. The coupling device as set forth in claim 1, wherein the force input part, the spring member and the force output part are secured together in position by means of a stabilizing mass of rubber-elastic material having a limited degree of mobility.

15. The coupling device as set forth in claim 14 wherein the spring member is embedded in the stabilizing mass.

16. The coupling device as set forth in claim 14, wherein the stabilizing mass is attached in place by vulcanization or by foam.

17. The coupling device as set forth in claim 14, wherein deformation-free spaces or recesses allowing movement are present, into which material of the stabilizing mass displaced during relative movement of the force input part and of the force output part may escape.

18. A coupling assembly for linking at least two linearly traversable members comprising:
    a linearly traversable drive member for providing movement in an axial direction;
    a linearly traversable guide member positioned substantially parallel to the drive member for guiding the linear traversable drive member as the linearly traversable drive member moves in the axial direction; and
    a link member comprising an elongated spring member being connected to the drive member at a first point and being connected to the guide member at a second point axially spaced from the first point, the link member being substantially non-yielding in its longitudinal direction and being flexible in at least one traverse direction to compensate for misalignment in parallelism between the drive member and guide member.

19. A coupling device for linking a linear drive and a linear guide comprising:

a force input part securable to the linear drive;

a force output part including a plate member securable to the linear guide, the plate member including a first and second end;

a link member disposed between and linking together the force input part and the force output part and restricting movement of the force input part and the force output part relative to each other in an axial direction, the link member being positioned substantially within the first and second ends of the plate member; and the link member including an elongate spring member being resiliently deflectable in a transverse direction and non-yielding in a longitudinal direction thereby permitting the force output part to move relative to the force input part in the transverse direction, the link member being axially secured to the force output part at a first connection point adjacent the first end of the plate member and axially secured to the force input part at a second connection point axially spaced from the first connection point and oppositely disposed from and adjacent to the second end of the plate member, the link member permiting relative movement between the force input part and the force output part thereby compensating for misalignment in parallelism between the linear drive and the linear guide.

20. A coupling device as defined in claim 19 wherein the link member is pivotally secured to the force output part at the first connection point and pivotally secured to the force input part at the second connection point such that the force input part and the force output part are rotatable relative to each other about an axis substantially parallel to the transverse direction of the spring member deflection, thereby permitting the force output part to move relative to the force input part in a direction substantially perpendicular to the transverse direction of the spring member deflection.

21. A coupling device for linking a linear drive and a linear guide comprising:

a force input part securable to the linear drive;

a force output part;

a link member disposed between and linking together the force input part and the force output part and restricting movement of the force input part and the force output part relative to each other in an axial direction;

the link member including an elongate spring member being resiliently deflectable in a transverse direction and non-yielding in a longitudinal direction thereby permitting the force output part to move relative to the force input part in the transverse direction, the link member being axially secured to the force output part at a first connection point and axially secured to the force input part at a second connection point axially spaced from the first connection point, such that the link member permits relative transverse movement between the force input part and the force output part thereby compensating for misalignment in parallelism between the linear drive and the linear guide; and the link member being pivotally secured at the first and second connection points such that the force input part and the force output part are rotatable relative to each other about an axis substantially parallel to the transverse direction of the spring member deflection, thereby permitting the force output part to move relative to the force input part in a direction substantially perpendicular to the transverse deflection of the spring member deflection.

* * * * *